United States Patent [19]

Minert et al.

[11] Patent Number: 5,033,390
[45] Date of Patent: Jul. 23, 1991

[54] TRILEVEL PERFORMANCE GAS GENERATOR

[75] Inventors: Roy T. Minert, Brigham City; Larry K. Hansen, Sandy; George F. Kirchoff, Brigham City; Donald R. Lauritzen, Hyrum, all of Utah

[73] Assignee: Morton International, Inc., Chicago, Ill.

[21] Appl. No.: 435,217

[22] Filed: Nov. 13, 1989

[51] Int. Cl.⁵ .................................................. C08D 5/00
[52] U.S. Cl. ...................................... 102/530; 102/357; 102/393; 102/489; 280/741; 280/742; 422/164
[58] Field of Search ............... 102/340, 342, 351, 357, 102/393, 489, 530, 531; 280/728, 736, 740, 741, 742; 422/164, 165, 166

[56] References Cited

U.S. PATENT DOCUMENTS

| | | | |
|---|---|---|---|
| 3,877,882 | 4/1975 | Lette et al. | 422/164 |
| 3,904,221 | 9/1975 | Shiki et al. | 102/530 |
| 3,972,545 | 3/1976 | Kirchoff et al. | 280/735 |
| 4,159,696 | 6/1979 | Wilhelm | 102/530 |
| 4,203,787 | 5/1980 | Kirchoff et al. | 149/35 |
| 4,369,079 | 1/1983 | Shaw | 149/2 |
| 4,380,346 | 4/1983 | Davis et al. | 280/736 |
| 4,796,912 | 1/1989 | Lauritzen et al. | 102/530 |
| 4,890,860 | 1/1990 | Schneiter | 280/741 |
| 4,919,897 | 4/1990 | Bender et al. | 102/530 |
| 4,950,458 | 8/1990 | Cunningham | 102/530 |

FOREIGN PATENT DOCUMENTS 2330194 12/1974 Fed. Rep. of Germany ...... 280/740

Primary Examiner—Harold J. Tudor
Attorney, Agent, or Firm—Gerald K. White

[57] ABSTRACT

A gas generator which may be used for ejecting submunitions. The gas generator comprises a diffuser chamber which is flanked by differently sized combustion chambers whereby three different ejection velocities may be achieved by firing only one of the combustion chambers or by firing both of them together. The generated gas is exited from the gas generator at the same central location, i.e., the centrally located diffuser chamber, to control submunition yaw and loading locations. The provision of combustion chambers at opposite ends of the diffuser chamber permits minimization of gas generator diameter, and a tie member in the diffuser chamber permits a non-complicated and inexpensive structure which is rugged and reliable. The gas generator may have other applications such as for inflating airbags for automobiles.

13 Claims, 1 Drawing Sheet

TRILEVEL PERFORMANCE GAS GENERATOR

The present invention relates generally to gas generators. More particularly, the present invention relates to a gas generator wherein more than one level or volume of gas production may be provided to allow versatility of performance levels for different circumstances for the same gas generator. For example, the ejection of submunitions from dispensers as they are flown over an airfield for an attack thereon may desirably require multiple ejection velocity options so that a selection of gas production volume may be made while the dispenser is on its flight mission to achieve the desired ejection velocity. Furthermore, it is desirable for the gas to exit from the gas generator at the same central location of the housing to control submunition yaw and submunition loading locations. However, the present invention may also be usable for other purposes such as for inflators for air bags, i.e., passive restraint cushions for providing impact protection to occupants of automobiles.

U.S. Pat. No. 3,972,545 to Kirchoff et al. discloses a multilevel gas generator with two adjacent combustion chambers both of which may be fired simultaneously for a maximum effectiveness in delivering gases to an inflatable structure with maximum speed. A slower rate of inflation to provide a softer cushioning effect but with the same quantity of gas is provided by firing only one of the igniters to allow the combustion in the corresponding combustion chamber to proceed through a partition to ignite the squib and gas generant in the other chamber. While providing certain advantages particularly with regard to inflating airbags, such a gas generator does not permit a choice of gas production volumes and therefore does not provide the versatility desired for ejection of submunitions at various ejection velocities.

U.S. Pat. No. 3,877,882 to Lette et al. also discloses a gas generator which has combustor compartments which are individually actuable by electrical squibs to provide inflation of an air cushion bag at different pressures depending upon the degree of impact. However, it is considered desirable to provide a gas generating device which is less complex or complicated in construction and which may have a smaller diameter for reduced cost and savings of space.

Therefore, it is an object of the present invention to provide a gas generator wherein any one of three levels of gas production may be selected.

It is another object of the present invention to provide such a gas generator wherein the gas exits therefrom at the same central location.

It is a further object of the present invention to provide such a gas generator to allow multiple ejection velocities of submunitions from dispensers while also providing control of submunition yaw and loading locations.

It is still another object of the present invention to provide such a gas generator which may have a small diameter.

It is yet another object of the present invention to provide such a gas generator which is non-complicated in construction.

It is another object of the present invention to provide such a gas generator which is inexpensive yet rugged and reliable.

The above and other objects, features, and advantages of this invention will be apparent in the following detailed description of the preferred embodiments thereof which is to be read in connection with the accompanying drawings.

IN THE DRAWINGS

FIG. 1 is a longitudinal sectional view of a gas generator which embodies the present invention; and FIG. 2 is a sectional view thereof taken along lines 2—2 of FIG. 1.

DETAILED DESCRIPTION OF THE PREFERRED EMBODIMENTS

Figure 1:
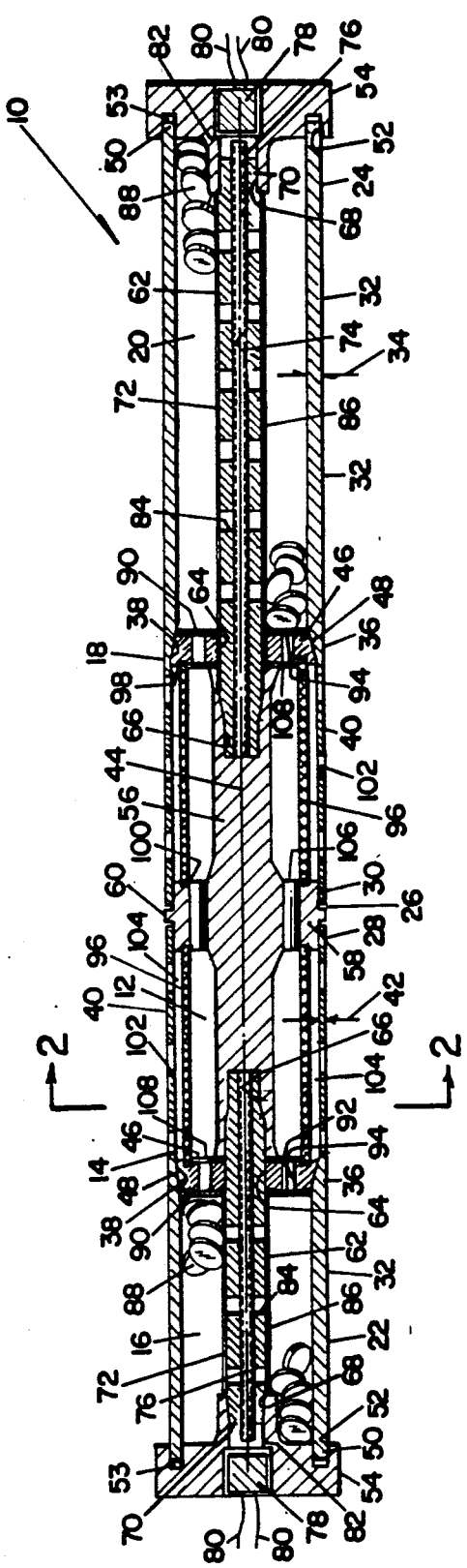
Figure 2:
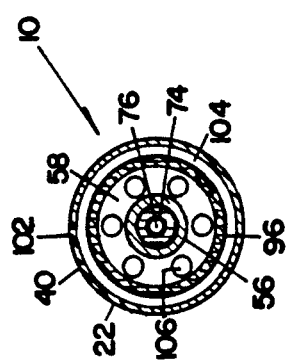

Referring to the drawings, there is illustrated at 10 an elongated generally cylindrical gas generator which includes a generally cylindrical diffuser chamber 12 to which is attached at one end 14 a first combustion chamber 16 and to which is attached at the other end 18 a second combustion chamber 20 as will be described in greater detail hereinafter. The gas generator 10 may perhaps have a length of about 11 inches and a diameter of about 1.25 inches.

The body of the gas generator 10 is composed of two generally cylindrical members 22 and 24 which are elongate and which are disposed in end-to-end relation with a small gap 26 between the ends 28 and 30 respectively. The cylindrical members 22 and 24 may be composed of any suitable material such as steel or lightweight aluminum. Each of the cylindrical members 22 and 24 defines the diameter of its respective combustion chamber 16 and 20 respectively and extends beyond the respective combustion chamber to the gap 26 so that the portions, illustrated at 40, of members 22 and 24 which extend beYond the respective combustion chambers together define the diffuser chamber 12 The portion 32 of each cylindrical member 22 and 24 which defines the respective combustion chamber 16 and 20 has a thickness, illustrated at 34, sufficient for withstanding the forces of combustion within the respective combustion chamber 16 and 20, for example, for aluminum this thickness 34 may perhaps be ¼ inch.

At the division between each of the combustion chambers 16 and 20 and the diffuser chamber 12 each of the cylindrical members 22 and 24 has a beveled or tapered portion, illustrated at 36, wherein the inner surface 38 thereof tapers radially outwardly to the diffuser chamber portion 40 thereof. Each portion 40 thus has a thickness, illustrated at 42, which is reduced in order to minimize gas generator weight but which is sufficient for the reduced pressures in the diffuser chamber 12. For example, for aluminum the thickness 42 may perhaps be 1/16 inch. In this specification and the claims, the term "radial" or "radially" is meant to refer to a direction toward or away from the longitudinal axis, illustrated at 44, of the generally cylindrical gas generator. The term "axial" or "axially" is meant to refer to a direction parallel to the axis 44. Thus, a member may extend both axially and radially at the same time.

A plate 46 of suitable material, such as steel or lightweight aluminum, has a tapered radially outer surface 48 corresponding to each respective tapered cylindrical member surface 38 and is suitably attached to the respective cylindrical member 22 and 24 such as herinafter described and is of suitable thickness, for example, ¼ inch, to contain the pressures to be generated in the respective combustion chamber 16 and 20.

The axially outer end portion 50 of each cylindrical member 22 and 24 is inserted in a mating cylindrical retaining groove 52 of a respective generally cylindrical end cap 54 and is suitably retained in the groove 52 by welding or other suitable attachment means to withstand the pressures of combustion in the respective combustion chamber 16 and 20. An o-ring 53 is disposed in each groove 52 to provide sealing. The end cap 54 is composed of a suitable material such as steel or lightweight aluminum having sufficient thickness, for example, ⅛ inch, to withstand the pressures of combustion in the respective combustion chambers 16 and 20.

In order to brace the plates 46 against the pressures of combustion in the respective combustion chambers 16 and 20, a tie member 56, preferably composed of stainless steel, is centrally disposed in the diffuser chamber 12 and extends longitudinally over the length of the diffuser chamber 12 and engages and is sealingly attached to the plates 46 by suitable means such as hereinafter described. The axially central portion 58 is enlarged radially to extend radially outwardly and engage both end portions 28 and 30 of the respective cylindrical members 22 and 24. A lip 60 of the enlarged portion 58 extends into the gap 26 between the cylindrical members 22 and 24 to act as a stop for positioning thereof.

A centrally disposed igniter 62 extends over the length of each of the combustion chambers 16 and 20. One end portion of each igniter 62 is inserted into axially aligned ports 64 and 66 of the respective plate 46 and end portion of the tie member 56 respectively for securing of the igniter 62 therein. The other end portion of each igniter 62 comprises a reduced diameter portion which is inserted in a port 68 of the respective end cap 54. Each igniter 62 includes a generally tubular housing 72 in which is contained a suitable pyrotechnic material illustrated at 74 which may be any of a variety of compositions which may suitably ignite the solid fuel gas generant material to be described hereinafter. A typical material for this use may be a granular mixture of 25% by weight of boron and 75% of potassium nitrate. The housing 72 preferably extends a substantial distance such as perhaps ⅜ inch into the respective port 66 of tie member 56 and is preferably composed of stainless steel having a diameter of perhaps 5/6 inch × 14 ga. wall in order to provide structural support to the gas generator. The pyrotechnic material 74 is ignitable by a hivelite or other suitable fuse 76 which extends over the length of the igniter 62 and centrally of igniter tube 72. The fuse 76 is ignitable by a suitable electric squib 78 energized by an electric source (not shown) through electric leads 80. Alternatively, a pyrotechnic transfer line may be provided to ignite the fuse 76. The squib 78 is disposed axially outwardly of the respective fuse 76 in a radially enlarged portion of the end cap port 68 and rests on a shoulder 82 thereof and is closely adjacent an end of the respective fuse 76 for ignition thereof.

The center tie 56 and the end caps 54 are preferably threadedly attached to the igniter tubes 72 respectively, to impart a compressive force along the longitudinal axis on each of plates 46 through the beveled engagement of tube portions 36 to plates 46 respectively. Thus, attachment of each plate to the respective cylindrical member 22 and 24 and the tie member 56 is attached to the plates 46 by the resulting compressive forces.

Each igniter housing 72 includes a plurality of perforations 84 for routing of ignition gases from combustion of the pyrotechnic material 74 into the respective combustion chambers 16 and 20. A thin layer of aluminum foil 86 or other suitable rupturable material surrounds the perforated igniter housing 72 to maintain the integrity of the pyrotechnic material 74 inside of the igniter housing 72 until ignition and to allow a build-up of pressure in the housing 72 at which time the pressure of ignition will rupture the foil 86 to allow ignition gases into the respective combustion chambers 16 and 20 to ignite combustible gas generating material illustrated at 88 which is contained therein.

The pellets 88 of gas generant material are uniformly distributed throughout the volume of the respective combustion chamber 16 and 20 and may be any one of a number of compositions meeting the requirements of burning rate, flame temperature, and, if for a gas bag installation, nontoxicity. One composition that may advantageously be utilized is that described in U.S. Pat. No. 4,203,787 to Kirchoff et al. Another composition that may advantageously be utilized is that described in U.S. Pat. No. 4,369,079 to Shaw. Both of these patents are assigned to the assignee of the present invention and are incorporated herein by reference.

Disposed in each combustion chamber 16 and 20 adjacent the respective plate 46 is a suitable filter and cooling screen 90 for filtering and cooling gas which is generated by burning of the gas generant pellets 88 in the respective combustion chamber 16 and 20 and for preventing passage of heavy particulate into the diffuser chamber 12 and thereby prevent clogging of filters, which will be described hereinafter, in the diffuser chamber. The filter and cooling screen 90 may, for example, be comprised of one or more layers of 50 mesh stainless steel screen. However, if the gas generator 10 is to be used for ejecting munitions, screen 90 may not be necessary.

Each of the plates 46 is provided with a plurality of ports 92 spaced circumferentially thereabout and radially outwardly of the tie member 56 to route generated gases from the respective combustion chamber 16 and 20 into the diffuser chamber 12, the gases passing through the filter and cooling screen 90 before passing through the apertures 92. The plates 46 may be covered, along the walls facing the respective combustion chambers, with a thin layer of aluminum foil 94 or other suitable rupturable material to hermetically seal the respective combustion chamber 16 and 20 against moisture. The aluminum foil 94 is ruptured by the combustion pressure for passage of the combustion gases through the plate apertures 92. A Styrofoam cushion (not shown) may be disposed in each combustion chamber between the respective screen 90 and gas generant material 88.

A generally cylindrical filter and cooling screen arrangement 96 is disposed in the diffuser chamber 12 radially outwardly of the plate apertures 92 to extend between each plate 46 and the tie member enlarged portion 58. Each filter and cooling screen assembly 96 is secured in notches 98 and 100 in the respective plate 46 and the tie member enlarged portion 58 respectively. Each filter and cooling assembly may be composed, for example, of one wrap of 30 mesh stainless steel screen followed by either one wrap of 100 mesh stainless steel screen or a wrap of sicafil material, a material marketed by Newmet Krebooge of the Federal Republic of Germany. However, such a filter and cooling assembly may not be necessary if the gas generator is used for ejecting munitions, but a large mesh filter may still be desired for filtering heavy particulate. The screen pack composition may be selected to effect specific gas temperatures for specific applications in accordance with principles commonly known to those of ordinary skill in the art to which this invention pertains.

Each of the diffuser chamber cylindrical member portions 40 includes a plurality of apertures 102 for routing of the generated gases for the desired use from the diffuser chamber 12 after first passing through the filter and cooling screen arrangement 96. The cooling and filter screen arrangement is spaced from the cylindrical member portions 40 to provide a plenum chamber illustrated at 104 therebetween for more efficient cooling and filtering of the gases by more effectively utilizing all of the filter and cooling screen arrangement for cooling and filtering of gases If the filtering and cooling screen arrangement were not spaced from the respective cylindrical member portions 40, there would be a tendency for the gases to undesirably pass through only the portions of the filter and cooling screen arrangement which are in line with the apertures 102 whereby other portions of the screen arrangement would not be effectively utilized.

In order to allow free communication of generated gases throughout the length of the diffuser chamber 12 so that if only one combustion chamber is fired both of the filter and cooling screens 96 are utilized for filtering the gas, a plurality of passageways 106 are provided in the tie member enlarged portion 58 radially inwardly of the filter and cooling screen arrangements 96 and spaced circumferentially thereabout. The dual filtering arrangement provided by the screens 90 and 96 is provided for a cleaner and cooler gas product than may be provided with a single screen arrangement.

As shown in the drawings, the first combustion chamber 16 is shorter and thus has a lesser volume for gas generant pellets 88 than the second combustion chamber 20. Thus, for a lower submunition ejection velocity, the first combustion chamber 16 may be fired alone. For a higher ejection velocity, the second combustion chamber 20 may be fired alone. For an even higher ejection velocity, both combustion chambers 16 and 20 may be fired together. In each case, the gas will exit from the gas generator at the same central location, i.e., the diffuser chamber apertures 102, so that submunition tip-off and loading locations may be controlled. The provision of the different size combustion chambers 16 and 20 at opposite ends of the diffuser chamber 12 allows a minimization of the gas generator diameter as well as non-complexity of construction so that the gas generator may be made inexpensively. The tie member 56 is provided for support of the plates 46 and igniters 62 for rugged and reliable operation of the gas generator 10. The construction also allows ignition of each of the igniters 62 from external gas generator ends.

In order to prevent the pellets 88 in one combustion chamber from igniting when the other combustion chamber is fired, a barrier member, illustrated at 108, composed of a suitable insulating material such as, for example, neoprene filled EPDM rubber having a thickness of perhaps 0.02 inch, is positioned in the diffuser chamber 12 and adhesively attached to the wall of the respective plate member 46 to cover the apertures 92 therein. However, the pressure of the combustion gases in the respective combustion chamber will burst through the barrier member 108 or detach it from the respective plate 46 to effect flow into the diffuser chamber 12.

Functioning of the gas generator 10 begins with an electric signal through the electric leads 80 to one or both of the squibs 78 for the respective combustion chambers 16 and 20 depending upon the desired ejection velocity to be achieved as previously discussed. The squib 78 causes the respective fuse 76 to ignite, and the fuse in turn ignites the granules 74 of pyrotechnic material in the respective igniter 62. The pyrotechnic material 74 burns and passes through the igniter perforations 84, rupturing the aluminum foil 86, and into the respective combustion chamber 16 and 20. The hot igniter gases ignite the gas generant pellets 88 which then burn and release gases. These gases flow through the filter and cooling screen pack 90 where they are cooled and filtered. The gases then rupture the aluminum foil 94, pass through the plate apertures 92, then burst through the barrier member 108, and flow into the diffuser chamber 12. The apertures 106 permit the gases to flow over the entire length of the diffuser chamber 12 so that both screen packs 96 may be utilized for cooling and filtering. The gases then flow through the filter and cooling screen packs 96 where they are again filtered and cooled and into the plenum chamber 104 from which they flow from the gas generator through the diffuser chamber apertures 102 for use to eject submunitions, to fill an automobile gas bag, or for any other desired suitable use.

It is to be understood that the invention is by no means limited to the specific embodiments which have been illustrated and described herein, and that various modifications thereof may indeed be made which come within the scope of the present invention as defined by the appended claims.

What is claimed is:

1. A gas generator comprising an elongated diffuser chamber means having a pair of end portions, a pair of combustion chamber means which extend axially outwardly from said end portions respectively and each of which contains gas generant material, a pair of plate means, an elongated tie member having a pair of end combustion chamber means from said diffuser chamber means, an elongate tie member having a pair of end portions which tie member is centrally disposed in said diffuser chamber means and which extends between and is attached to said plate means, a pair of elongated igniter means each of which has an end portion and each of which is centrally disposed in a respective one of said combustion chamber means and extending axially thereof for igniting said gas generant material in said respective combustion chamber means, means in each said plate means and said respective tie member end portion for supportively receiving said respective igniter means end portion, aperture means in each said plate means for routing gases from said respective combustion chamber means to said diffuser chamber means, and means for routing the gases from said diffuser chamber means.

2. A gas generator as claimed in claim 1 wherein said combustion chamber means are sized to have different volumes.

3. A gas generator as claimed in claim 1 wherein said diffuser chamber means has a wall thickness which is less than said combustion chamber means wall thickness.

4. A gas generator as claimed in claim 1 wherein said diffuser chamber means has a generally cylindrical wall and said tie member includes a centrally disposed radially enlarged portion which extends radially outwardly to engage said diffuser chamber means wall.

5. A gas generator as claimed in claim 4 wherein said tie member enlarged portion includes a plurality of passage means to permit gas flow from either of the combustion chamber means throughout said diffuser chamber means.

6. A gas generator as claimed in claim 5 wherein the gas generator includes two cylindrical members which define cylindrical walls respectively of the combustion chamber means and which extend beyond said respective combustion chamber means to be disposed in spaced end to end relation to together define the diffuser chamber wall, and said tie member enlarged portion engages said spaced cylindrical members and includes a radially outer portion which is disposed between said spaced cylindrical members.

7. A gas generator as claimed in claim 6 wherein said gas routing means comprises aperture means in said cylindrical members, the gas generator further comprises at least one generally cylindrical gas filter means in said diffuser chamber means which is disposed radially outwardly of said tie member enlarged portion passage means and said plate means aperture means and which is spaced radially from said cylindrical member aperture means to define a plenum chamber therebetween.

8. A gas generator as claimed in claim 7 further comprising a gas filter means disposed in at least one of said combustion chamber means adjacent said respective plate means.

9. A gas generator as claimed in claim 8 further comprising means for preventing gas flow from one of said combustion chamber means from passing from said diffuser chamber means into the other of said combustion chamber means to prevent gas generant material in an unfired combustion chamber means from being ignited.

10. A gas generator as claimed in claim 1 wherein said gas routing means comprises aperture means in cylindrical members which define said diffuser chamber, the gas generator further comprising at least one generally cylindrical gas filter means disposed in said diffuser chamber means and spaced from said cylindrical member aperture means to define a plenum chamber therebetween.

11. A gas generator as claimed in claim 10 further comprising a gas filter means disposed in at least one of said combustion chamber means adjacent said respective plate means.

12. A gas generator as claimed in claim 1 further comprising means for preventing gas flow from one of said combustion chamber means from passing from said diffuser chamber means into the other of said combustion chamber means to prevent gas generant material in an unfired combustion chamber means from being ignited.

13. A gas generator as claimed in claim 12 wherein said gas flow preventing means comprises a barrier member composed of insulating material disposed in said diffuser chamber means and attached to said respective plate means for said other of said combustion chamber means to sealingly cover said respective plate means aperture means for prevention of gas flow from the diffuser chamber means into said other of said combustion chamber means.

* * * * *

UNITED STATES PATENT AND TRADEMARK OFFICE
CERTIFICATE OF CORRECTION

PATENT NO.   :   5,033,390
DATED        :   July 23, 1991
INVENTOR(S)  :   Minert et al.

It is certified that error appears in the above-identified patent and that said Letters Patent is hereby corrected as shown below:

At column 1, line 23, "Kirchoff et al." should be -- Kirchoff et al. --.

At column 1, line 40, "Lette et al." should be -- Lette et al. --.

At column 2, line 35, "beYond" should be -- beyond --.

At column 2, line 36, "12 The" should be -- 12. The --.

At column 3, lines 7-8, "dis-Posed" should be -- disposed --.

At column 3, line 20, "axiallY" should be -- axially --.

At column 4, line 17, "Kirchoff et al." should be -- Kirchoff et al. --.

UNITED STATES PATENT AND TRADEMARK OFFICE
CERTIFICATE OF CORRECTION

PATENT NO. : 5,033,390
DATED : July 23, 1991
INVENTOR(S) : Minert, et al

It is certified that error appears in the above-indentified patent and that said Letters Patent is hereby corrected as shown below:

At column 4, line 19, "Shaw" should be -- Shaw --

At column 5, line 14, "gases If" should be --gases. If --.

At column 6, line 39, delete "an elogated tie member having a pair of end" and insert in replacement thereof --each of which separates a respective one of said --.

At column 8, line 6, "chamber," should be --chamber means, --.

Signed and Sealed this

Sixth Day of September, 1994

Attest:

BRUCE LEHMAN

Attesting Officer

Commissioner of Patents and Trademarks